(12) United States Patent
Schmalstieg et al.

(10) Patent No.: US 11,132,831 B1
(45) Date of Patent: Sep. 28, 2021

(54) METHODS AND APPARATUS FOR EFFICIENT MULTI-VIEW RASTERIZATION

(71) Applicant: QUALCOMM Incorporated, San Diego, CA (US)

(72) Inventors: Dieter Schmalstieg, Graz (AT); Bernhard Kerbl, Graz (AT); Philip Voglreiter, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/806,774

(22) Filed: Mar. 2, 2020

(51) Int. Cl.
*G06T 15/20* (2011.01)
*G06T 15/80* (2011.01)

(52) U.S. Cl.
CPC .............. *G06T 15/20* (2013.01); *G06T 15/80* (2013.01); *G06T 2210/21* (2013.01)

(58) Field of Classification Search
None
See application file for complete search history.

(56) References Cited

U.S. PATENT DOCUMENTS

| | | | | |
|---|---|---|---|---|
| 6,380,935 | B1* | 4/2002 | Heeschen | G06T 15/005 345/423 |
| 6,614,444 | B1* | 9/2003 | Duluk, Jr. | G06T 15/005 345/581 |
| 7,839,421 | B2 | 11/2010 | Bethune et al. | |
| 9,336,558 | B2* | 5/2016 | Cote | H04N 19/423 |
| 9,747,660 | B2* | 8/2017 | Redshaw | G06T 1/60 |
| 2004/0125103 | A1* | 7/2004 | Kaufman | G06T 15/40 345/419 |
| 2008/0143720 | A1 | 6/2008 | Elmquist | |
| 2015/0287158 | A1* | 10/2015 | Cerny | G06T 15/10 345/553 |
| 2016/0117855 | A1* | 4/2016 | Lee | G06T 11/001 345/421 |

(Continued)

FOREIGN PATENT DOCUMENTS

WO 2019129923 A1 7/2019

OTHER PUBLICATIONS

Dai P., et al., "Neural Point Cloud Rendering via Milti-Plane Projection", arviv.org, Cornell University Library, 201 Olin Library Cornell Iniversity Ithica, NY, 14853, Dec. 10, 2019 (Dec. 10, 2019), 17 Pages, XP081548807, The whole document.

(Continued)

*Primary Examiner* — Jeffrey J Chow
(74) *Attorney, Agent, or Firm* — Campbell C. Chiang; Procopio, Cory, Hargreaves & Savitch LLP

(57) ABSTRACT

The present disclosure relates to methods and apparatus for graphics processing. Aspects of the present disclosure can determine at least one scene including one or more viewpoints. Also, aspects of the present disclosure can divide the at least one scene into a plurality of zones based on each of the one or more viewpoints. Further, aspects of the present disclosure can determine whether a zone based on one viewpoint of the one or more viewpoints is substantially similar to a zone based on another viewpoint of the one or more viewpoints. Aspects of the present disclosure can also generate a geometry buffer for each of the plurality of zones based on the one or more viewpoints. Moreover, aspects of the present disclosure can combine the geometry buffers for each of the plurality of zones based on the one or more viewpoints.

49 Claims, 11 Drawing Sheets

(56) References Cited

U.S. PATENT DOCUMENTS

| | | | |
|---|---|---|---|
| 2016/0260241 A1* | 9/2016 | Jin | G06T 15/005 |
| 2016/0364901 A1* | 12/2016 | Balci | G06T 15/06 |
| 2017/0178279 A1 | 6/2017 | Kakarlapudi et al. | |
| 2017/0330372 A1* | 11/2017 | Kakarlapudi | G06T 15/80 |
| 2019/0066370 A1* | 2/2019 | Schmalstieg | G06T 15/005 |
| 2020/0143580 A1* | 5/2020 | Seiler | G06T 15/08 |
| 2020/0193704 A1* | 6/2020 | Wang | G06T 17/10 |

OTHER PUBLICATIONS

Hasselgren J., et al., "An Efficient Multi-View Rasterization Architecture", Proceedings of the 17th Eurographics Conference on Rendering Techniques, Jun. 26, 2006, 12 Pages, XP055100849, ISSN: 1727-3463, DOI:10.2312/EGWR/EGSRO6/061-072ISBN: 978-3-90-567335-7. The whole document.

International Search Report and Written Opinion—PCT/US2021/019730—ISA/EPO—dated May 25, 2021.

* cited by examiner

METHODS AND APPARATUS FOR EFFICIENT MULTI-VIEW RASTERIZATION

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a graphics processing unit (GPU), or any apparatus that can perform graphics processing. The apparatus can determine at least one scene including one or more viewpoints. Also, the apparatus can divide the at least one scene into a plurality of zones based on each of the one or more viewpoints. Further, the apparatus can determine whether a zone based on one viewpoint of the one or more viewpoints is substantially similar to a zone based on another viewpoint of the one or more viewpoints. The apparatus can also generate a geometry buffer for each of the plurality of zones based on the one or more viewpoints. Moreover, the apparatus can combine the geometry buffers for each of the plurality of zones based on the one or more viewpoints. The apparatus can also determine shading information for at least some of the potentially visible set of primitives. Additionally, the apparatus can also store at least some of the potentially visible set of primitives. The apparatus can also render at least one image based on the geometry buffer for each of the plurality of zones of the one or more viewpoints.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
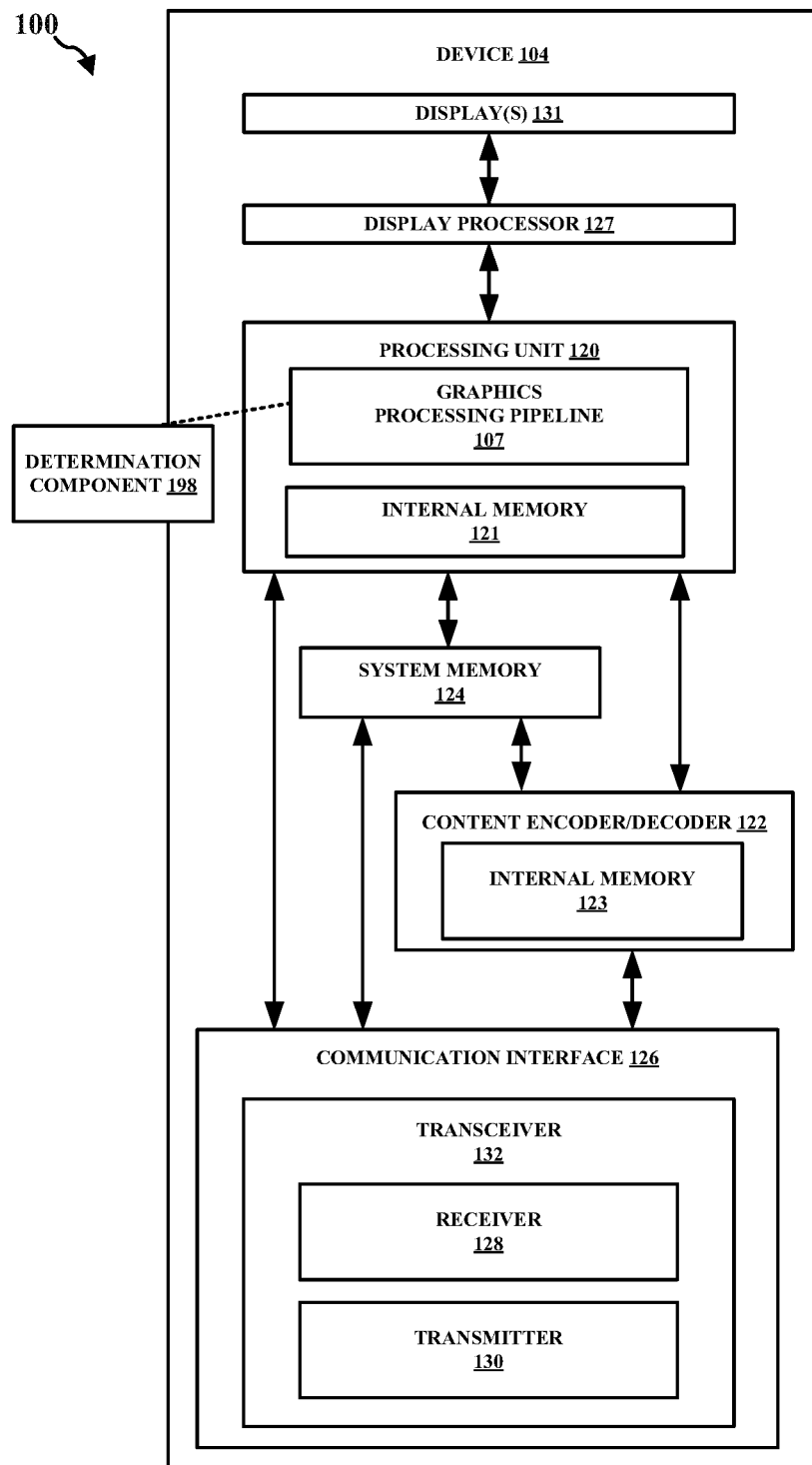
FIG. 1 is a block diagram that illustrates an example content generation system in accordance with one or more techniques of this disclosure.

Multi-view rasterization (MVR) is a manner of rasterizing a scene or image based on the use of multiple views. For example, MVR can generate a number of views from a number of similar camera viewpoints or positions. A viewpoint can be divided into multiple zones or sub-buffers. In some instances, if a primitive is in multiple zones or sub-buffers, there may be clipping, i.e., the division of the primitive at the border of the zone or sub-buffer. Moreover, the amount of viewpoints that are generated for objects at a far distance from a viewpoint or camera in MVR can be high. For instance, these viewpoints at a far distance from the camera may be discarded and/or not utilized. Aspects of the present disclosure can solve the aforementioned clipping issues or issues with a large number of viewpoints in MVR. For instance, aspects of the present disclosure can reduce the amount of viewpoints that are generated for objects at a far distance from a viewpoint or camera in MVR. In some instances, aspects of the present disclosure can determine whether a zone for one viewpoint is substantially similar or identical to a zone for another viewpoint.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to determine at least one scene including one or more viewpoints. The determination component 198 can also be configured to divide the at least one scene into a plurality of zones based on each of the one or more viewpoints. The determination component 198 can also be configured to determine whether a zone based on one viewpoint of the one or more viewpoints is substantially similar to a zone based on another viewpoint of the one or more viewpoints. The determination component 198 can also be configured to generate a geometry buffer for each of the plurality of zones based on the one or more viewpoints. The determination component 198 can also be configured to combine the geometry buffers for each of the plurality of zones based on the one or more viewpoints. The determination component 198 can also be configured to determine shading information for at least some of the potentially visible set of primitives. The determination component 198 can also be configured to store at least some of the potentially visible set of primitives. The determination component 198 can also be configured to render at least one image based on the geometry buffer for each of the plurality of zones of the one or more viewpoints.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may change the corresponding context. Additionally, the workload that corresponds to the mode or state may follow the changing mode or state.

Figure 2:
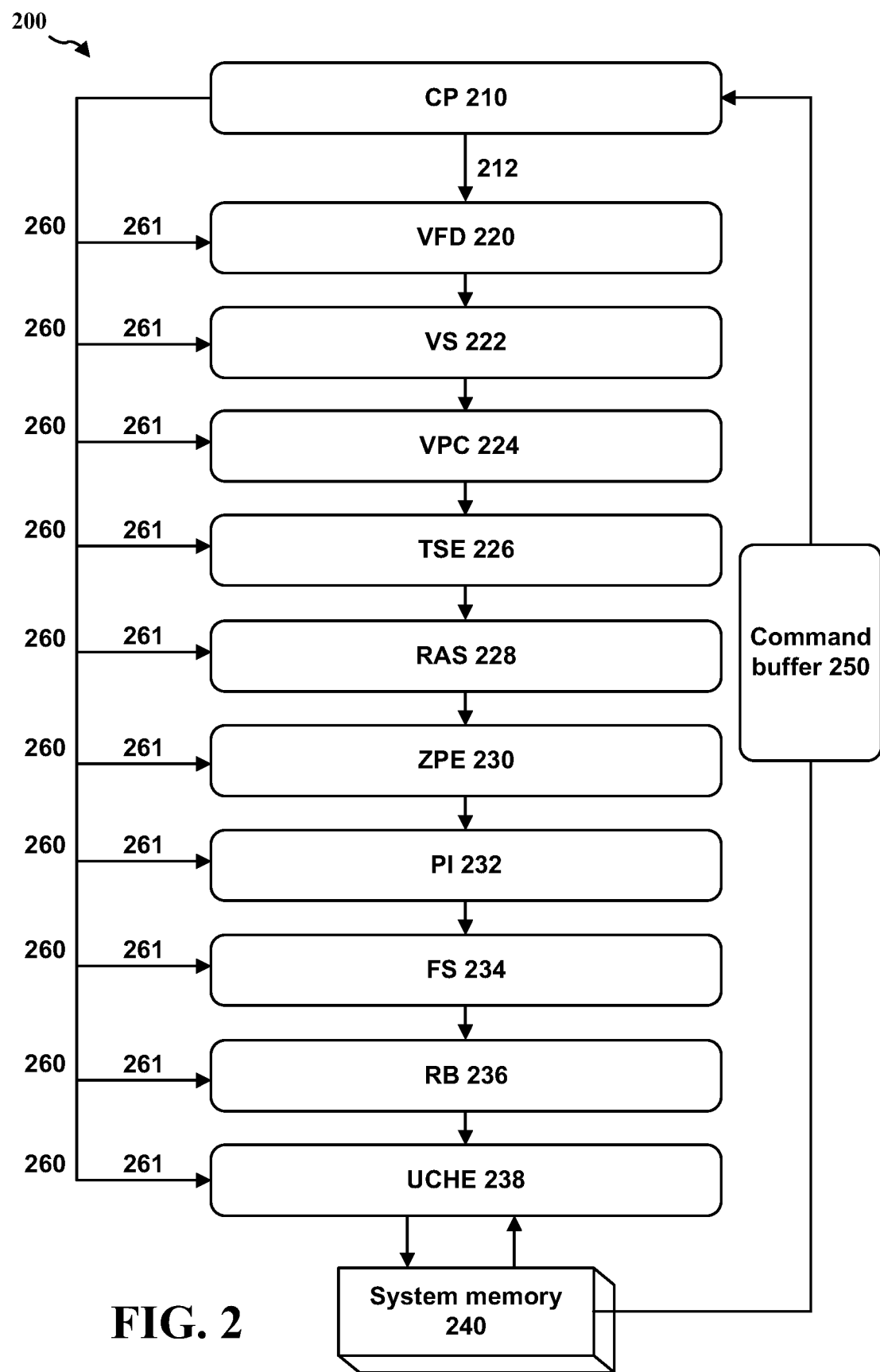
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitives in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
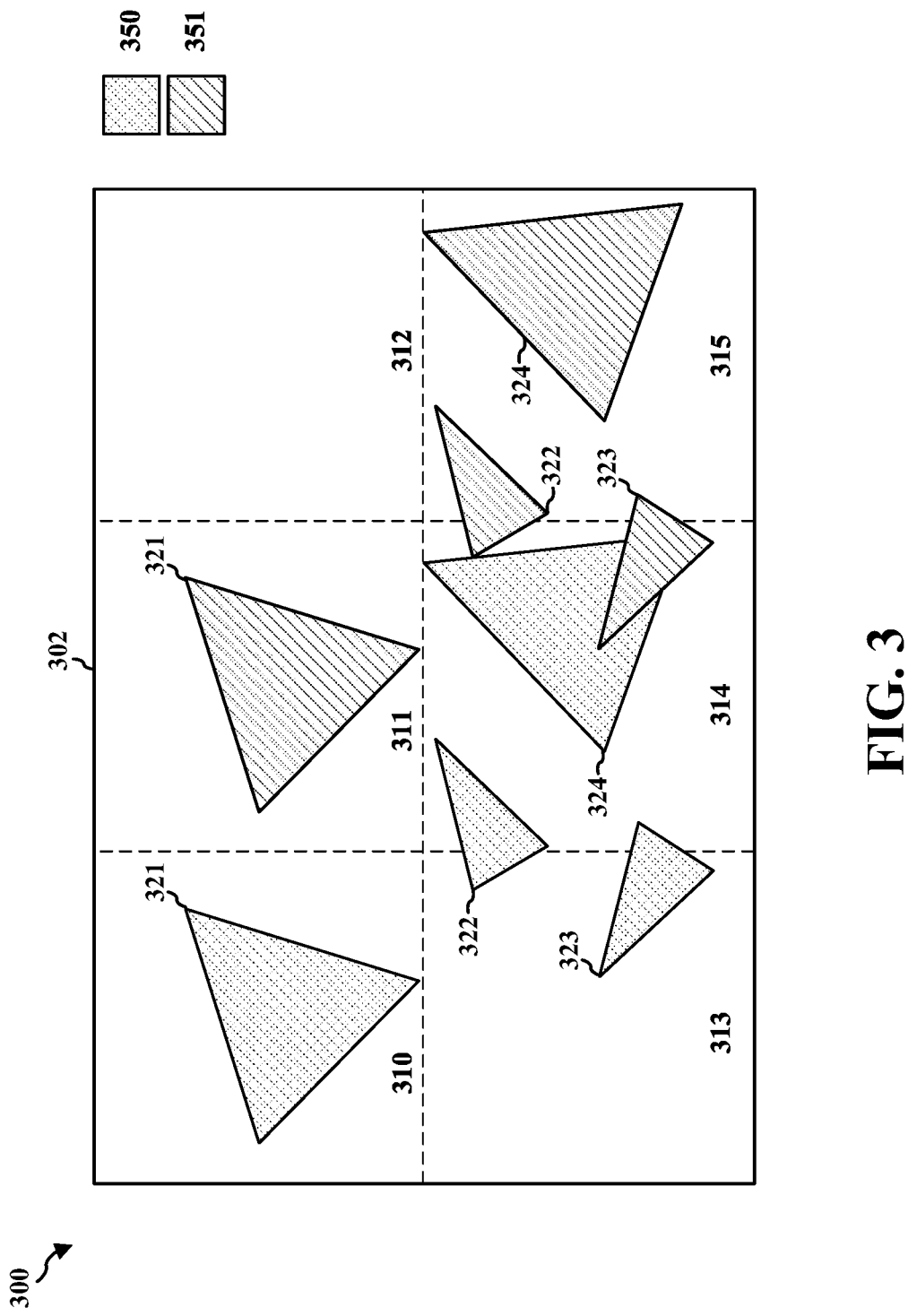
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, wherein, as discussed above, a surface is divided into multiple bins or tiles and then each bin or tile can be separately rendered. Further, in tiled rendering, the frame buffer can be partitioned into multiple bins or tiles.

As indicated herein, in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

In some aspects, GPUs can perform a tessellation or tessellation process. During a tessellation process, larger primitives can be divided into smaller sub-primitives or tessellated primitives. Tessellation can divide an image into more detailed sub-primitives or tessellated primitives, which can lead to a more detailed rendering process and more detailed graphical content. A tessellator can determine or generate the sub-primitives or tessellated primitives. In some aspects, one or more primitives can be grouped into a patch. A tessellator can then determine or generate a geometry-based tessellation of the patch, e.g., using triangles or rectangles, according to one or more tessellation parameters.

The tessellation process can allow for determining or generating a more detailed or smoother image or surface than would otherwise be generated based on the original patch of primitives. Additionally, tessellation can be used for implementing or rendering more detailed surfaces in an image. As mentioned above, the tessellation process can produce sub-primitives or tessellated primitives. These sub-primitives or tessellated primitives are generated as an output from the tessellation, e.g., based on one or more primitives or patches. These primitives can also be referred to as original or regular primitives, which are generated based on the original image or surface value. The determined or generated sub-primitives or tessellated primitives can be a more detailed version of the original primitive or patch. In some instances, each of the sub-primitives can be smaller than each of the primitives or patch. Accordingly, the original primitives may appear to be divided into the sub-primitives or tessellated primitives.

Figure 4:
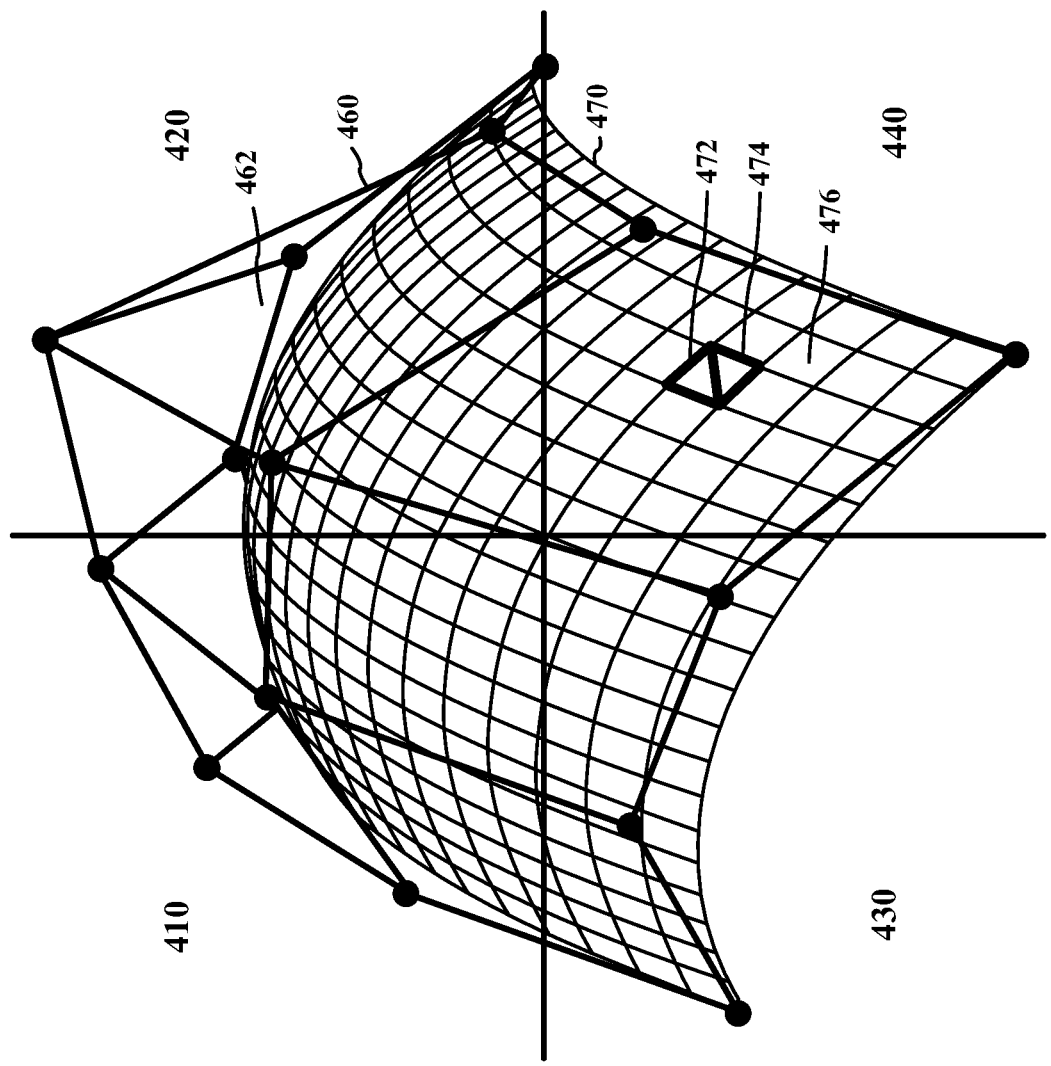
FIG. 4 illustrates an example image or surface in accordance with one or more techniques of this disclosure.

FIG. 4 illustrates an example image or surface 400 in accordance with one or more techniques of this disclosure. FIG. 4 illustrates that the image 400 is divided into multiple bins, e.g., bin 410, bin 420, bin 430, and bin 440. Also, FIG. 4 displays patch 460 which includes one or more primitives 462. In some aspects, patch 460 can be referred to as a group of primitives or one or more primitives. FIG. 4 also displays a plurality of sub-primitives 470 which includes sub-primitive 472, sub-primitive 474, and sub-primitive 476. As shown in FIG. 4, the individual sub-primitives in the plurality of sub-primitives 470 can be a number of different shapes such as rectangles, e.g., sub-primitive 476, or triangles, e.g., sub-primitives 472, 474.

FIG. 4 displays an example of the aforementioned tessellation process. For example, the original or input primitives, e.g., one or more primitives 462 in patch 460, are displayed as the larger triangles with the dots as vertices. The sub-primitives or tessellated primitives, e.g., sub-primitives 470, that are output from the tessellation process are displayed as the smaller rectangles or triangles on the surface 400, e.g., sub-primitives 472, 474, 476.

Multi-view rasterization (MVR) is a manner of rasterizing a scene or image based on the use of multiple views. For example, MVR can calculate or generate a number of views from a number of similar camera positions. These views can be based on a similar camera viewpoint. MVR can be utilized with a number of different rendering aspects, such as a potentially visible set (PVS). In some aspects, these multiple views can be generated or computed, and a PVS can be compiled from the data based on these multiple views. In some instances, a PVS can be utilized for a number of different graphics processing methods, e.g., split rendering or vector streaming.

MVR can also be used when rendering visual results that are different from plain images, e.g., light fields or focal stacks. This can be important for virtual reality (VR), augmented reality (AR), or extended reality (XR) displays, or, in general, displays with dynamic focus cues. MVR can also complement other shading methods, e.g., object-space shading. In some aspects, MVR can allow a GPU to exploit certain aspects of object-space shading, e.g., spatial and/or temporal coherence. Additionally, in some instances, MVR can generate multiple images from a single data structure storing pre-shaded information, e.g., a texture or a shading atlas. Further, MVR can provide decoupled shading on a variety of different GPUs.

Figure 5:
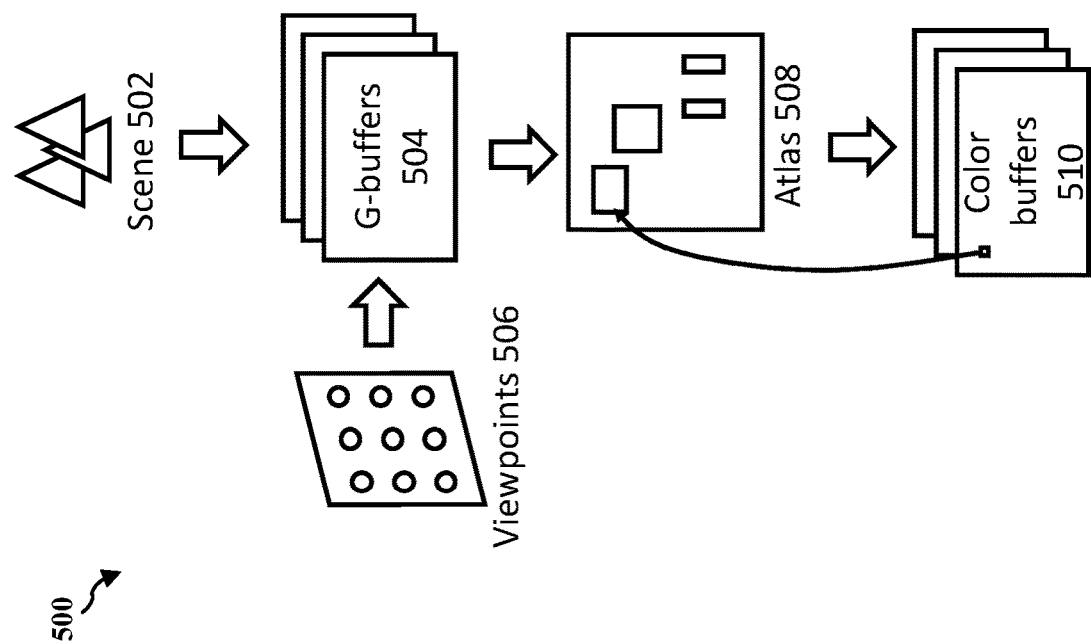
FIG. 5 illustrates an example diagram including multi-view rasterization in accordance with one or more techniques of this disclosure.

FIG. 5 illustrates diagram 500 including multi-view rasterization in accordance with one or more techniques of this disclosure. As shown in FIG. 5, diagram 500 includes a scene 502, geometry buffers (G-buffers) 504, viewpoints 506, atlas or shading atlas 508, and color buffers 510. FIG. 5 displays an example of a process, e.g., rendering a light field.

As shown in FIG. 5, the input of the process includes scene 502 comprising a number of primitives, e.g., N primitives. The input of the process also includes multiple viewpoints 506, which can be arranged in a grid, e.g., a grid of $K^2$ viewpoints arranged in a square pattern in a plane. Additionally, the output of the process after the first state may include a number of G-buffers 504, e.g., $K^2$ G-buffers. These G-buffers 504 can include a number of values, e.g., a z value, an identification (id), and/or texture horizontal (U) vertical (V) (UV) coordinates (tex-uv). Also, each of the G-buffers 504 can share one atlas or shading atlas 508. Further, the output of the process includes color buffers 510, e.g., $K^2$ color buffers, for the light field. Accordingly, FIG. 5 displays that there can be three integrated passes to render a light field.

As shown in FIG. 5, the process or algorithm can include multiple passes or phases, e.g., pass 1, pass 2, and/or pass 3. For instance, pass 1 can include a visibility pass, which includes a MVR of viewpoints 506 to G-buffers 504. For instance, pass 1 can include a $K^2$ grid of viewpoints to a number of buffers, e.g., depth, id, and tex-uv buffers. The algorithm also includes a pass 2, which can be a shading pass. In the shading pass, the PVS of the id of each buffer can be shaded into an atlas or shading atlas 508. Additionally, pass 3 can include a resolve pass, which can include deferred rendering to re-sample atlas textures into perspective views stored in color buffers 510, e.g., $K^2$ color buffers.

Aspects of the present disclosure can also include a variety of geometry stages. For example, the present disclosure can include $K^2$ draw calls. Aspects of the present disclosure can also include instancing each primitive $K^2$ times with a vertex shader, as well as instancing each primitive $K^2$ times with a geometry shader with a fixed output, e.g., an output of 1. Moreover, aspects of the present disclosure can include a geometry shader with a fixed output, e.g., an output of $K^2$, or a number of extensions for MVR. Additionally, the present disclosure can include a mesh shader as a geometry stage.

Aspects of the present disclosure can also include a number of different buffers, e.g., sub-buffers defined in software. In order to store multiple buffers or G-buffers, the present disclosure may allocate memory for this storage, e.g., system memory 124 and/or internal memory 121. For instance, the present disclose can include a variety of G-buffers, as the amount of hardware k-buffers or other framebuffer attachments may be limited. Based on this, aspects of the present disclosure can utilize an implementation in software. For instance, if there is enough memory in the GPU or CPU, the buffers can be implemented in software. For example, the present disclosure can implement this process using one large buffer split into different regions, e.g., rectangular regions. Aspects of the present disclosure can also include a vertex shader, e.g., a vertex shader which, for each vertex, determines a sub-buffer id to which the vertex should send its output. Also, aspects of the present disclosure can include a look-up per sub-buffer (x,y) offset and combine this with a vertex.

Figure 6:
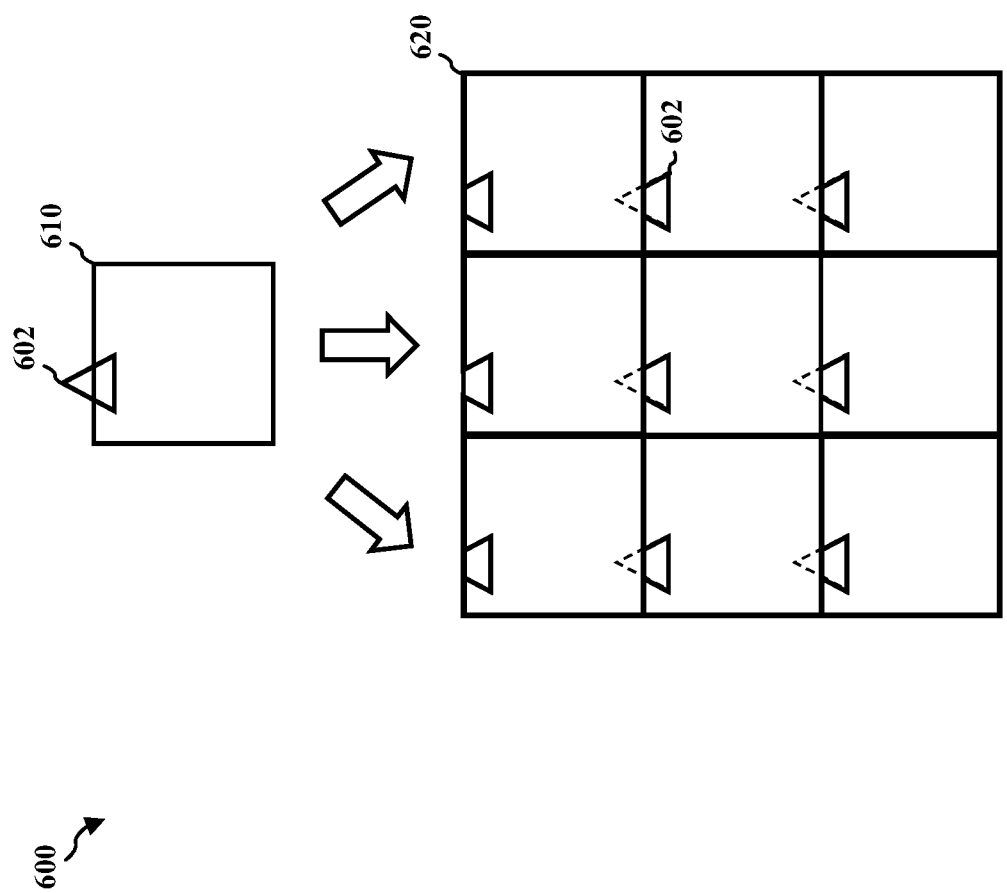
FIG. 6 illustrates an example diagram including a buffer and sub-buffers in accordance with one or more techniques of this disclosure

FIG. 6 illustrates diagram 600 in accordance with one or more techniques of this disclosure. As shown in FIG. 6, diagram 600 includes a buffer 610, sub-buffers 620, and primitive 602. FIG. 6 displays that primitive 602 from buffer 610 can be varied slightly for different regions or zones of sub-buffers 620. In some aspects, a geometry shader or mesh shader can perform this process.

As shown in FIG. 6, if a primitive is in multiple sub-buffers, e.g., primitive 602 in sub-buffers 620, there may be clipping, i.e., the division of the primitive at the border of the zone or sub-buffer 620. In some aspects, the clipping or the division of primitives may be implemented in software. For instance, the present disclosure can discard clipped primitives in a fragment shader. Aspects of the present disclosure can also utilize hardware clipping planes. Further, aspects of the present disclosure can include a stencil mask per sub-buffer.

As indicated above, there is a present need to efficiently solve primitive clipping issues or the division of primitives at sections or zones for MVR. Moreover, the amount of viewpoints that are generated for objects at a far distance from a viewpoint or camera in MVR can be high. For instance, if a primitive is a far distance from the viewpoints, the projection of the primitive into each of the views may be similar, or in some instances identical, and each of the projections may not need to be computed. As such, there is a present need to reduce the amount of viewpoints that are generated for objects at a far distance from a viewpoint or camera in MVR.

Aspects of the present disclosure can solve the aforementioned clipping issues or issues with a large number of viewpoints in MVR. For instance, aspects of the present disclosure can reduce the amount of viewpoints that are generated for objects at a far distance from a viewpoint or camera. In some instances, aspects of the present disclosure can determine whether a zone for one viewpoint is substantially similar or identical to a zone for another viewpoint.

Figure 7:
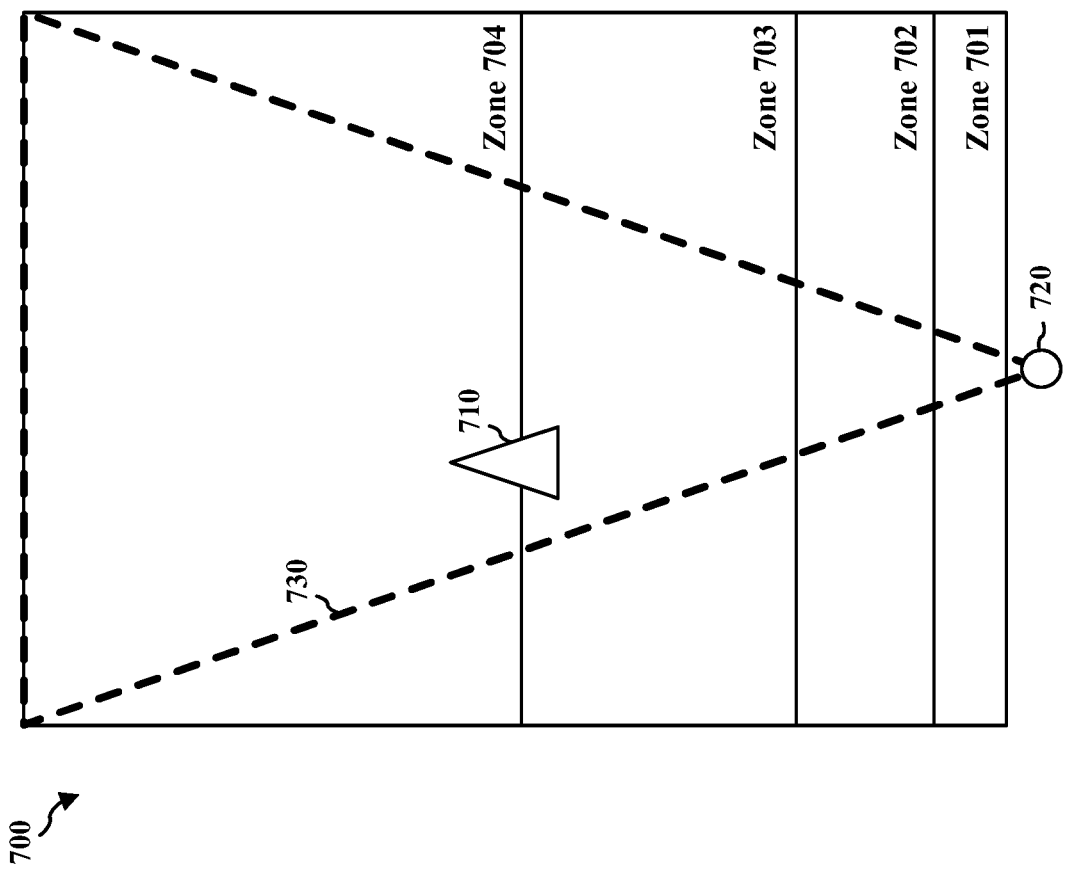
FIG. 7 illustrates an example scene in accordance with one or more techniques of this disclosure.

FIG. 7 illustrates scene 700 in accordance with one or more techniques of this disclosure. More specifically, FIG. 7 is a top view or birds eye view of the scene 700. As shown in FIG. 7, scene 700 includes a number of zones or sections, e.g., zone 701, zone 702, zone 703, and zone 704. Scene 700 also includes primitive or triangle 710, viewpoint or camera 720, and viewing frustum 730. Primitive or triangle 710 can span multiple zones, e.g., zones 703 and 704. Also, viewpoint or camera 720 is the dot near the bottom of scene 700. Camera 720 can be one camera position in the scene 700, where there are a number of other camera positions, e.g., three or nine camera positions.

Aspects of the present disclosure can assign the zones, e.g., zones 701, 702, 703, and 704, to separate sub-buffers. By doing so, there will be a three dimensional (3D) subdivision of the scene 700. So the present disclosure can sub-divide the scene 700 into multiple zones. In some aspects, there can be one sub-buffer per camera, as well as per zone. Also, the distance from the camera 720 to the primitive 710 can remain the same when switching viewpoints. As shown in FIG. 7, primitive 710 can be split between different zones, e.g., zone 703 and zone 704. In some aspects, primitive 710 can be assigned to a particular zone, e.g., zone 703. Accordingly, if a primitive or triangle is split between zones, the primitive or triangle may be assigned to the smaller zone.

Additionally, as shown in FIG. 7, each zone can be a multiple of the other zones. For example, zone 702 can be twice the size of zone 701, zone 703 can be twice the size of zone 702, and/or zone 704 can be twice the size of zone 703. As shown in FIG. 7, the zones can grow increasingly larger as they move away from camera 720. As objects move away from the camera 720, there may be an exponential reduction in the amount of views. This can limit the amount of potential disparities between camera views. So if an object is far away from the camera, there may be little disparity between similar camera positions, e.g., if the camera is translated slightly parallel to the image plane. As such, the present disclosure can limit the amount of camera positions or viewpoints as an object gets increasingly far away from the camera. In some aspects, the present disclosure can select a representative camera position or viewpoint, and then use this viewpoint for substantially similar viewpoints or camera positions.

In some aspects, for a number of views, e.g., $K^2$ views, different zones may correspond to a different amount of views as they move away from the camera. For example, a zone Z can correspond to $K^2/4^{(Z-1)}$ views. For example, zone 701 (closest to camera 720) may correspond to $K^2$ views, zone 702 may correspond to $K^2/4$ views, zone 703 can correspond to $K^2/16$ views, and zone 704 can correspond to $K^2/64$ views. As the denominator $4^{(Z-1)}$ gets increasingly large, the corresponding zone Z can approach one view. In some instances, if a depth buffer of a selected viewpoint in a zone, e.g., zone 701, is less than infinity, then the present disclosure can select the viewpoint in the next zone, e.g., zone 702.

As shown in FIG. 7, aspects of the present disclosure can subdivide a frustum, e.g., viewing frustum 730, into Z depth zones. This can include a number of exponential depth intervals, such that subdividing a frustum can include an interval disparity that is halved with each successive interval, e.g., intervals of [1-2m], [2-4m], [4-8m], etc. Further, aspects of the present disclosure can treat each zone as a separate sub-buffer with its own depth buffer.

As mentioned above, aspects of the present disclosure can also render primitives into exactly one zone. For instance, a zone can be selected in the geometry shader by quantizing a minimum depth of vertices. The present disclosure can quantize inverse zones, such that the amount of views is reduced for zones farther away from the camera. As indicated above, if a primitive or triangle is split between zones, the primitive can be assigned to the smaller of the shared zones. If there is no geometry shader in the process, the zone can be selected in a vertex shader using neighboring attributes.

Figure 8:
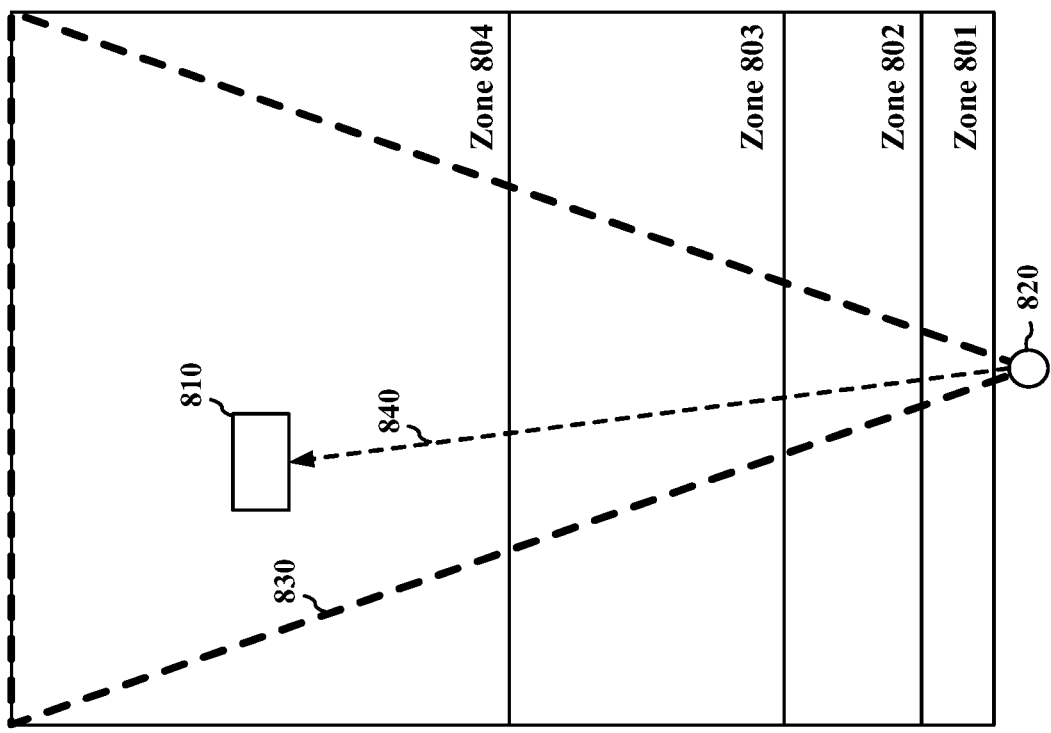
FIG. 8 illustrates an example scene in accordance with one or more techniques of this disclosure.

FIG. 8 illustrates scene 800 in accordance with one or more techniques of this disclosure. More specifically, FIG. 8 is a top view or birds eye view of the scene 800. As shown in FIG. 8, scene 800 includes a number of zones or sections, e.g., zone 801, zone 802, zone 803, and zone 804. Scene 800 also includes object 810, viewpoint or camera 820, viewing frustum 830, and viewing ray 840. Object 810 can span multiple zones or be assigned to a single zone, e.g., zone 804. Also, viewpoint or camera 820 is the dot near the bottom of scene 800. Camera 820 can be one camera position in the scene 800, where there are a number of other camera positions, e.g., three or nine camera positions. Aspects of the present disclosure can assign the zones, e.g., zones 801, 802, 803, and 804, to separate sub-buffers. By doing so, there will be a 3D sub-division of the scene 800. Indeed, the present disclosure can sub-divide the scene 800 into multiple zones.

As indicated above, the geometry buffers or G-buffers can be equivalent to a light field. During the resolve pass, any viewing ray or 4D ray can be traced through zone views. In some aspects, the present disclosure may determine the correct coordinates in each view. For a viewing ray starting in a new viewpoint, which may not be identical to the viewpoints that were rendered, the present disclosure may interpolate samples from the existing views. The viewing ray can also be a line of sight or viewpoint from a particular camera position, e.g., viewing ray 840 from camera 820. Also, after the primitive id and the tex-uv are determined, aspects of the present disclosure can look-up shading in an atlas or shading atlas. As indicated above, for a number of views, e.g., $K^2$ views, different zones may correspond to a different amount of views as they move away from the camera. For example, a zone Z can correspond to $K^2/4^{(Z-1)}$ views. For example, zone 801 may correspond to $K^2$ views, zone 802 may correspond to $K^2/4$ views, zone 803 can correspond to $K^2/16$ views, and zone 804 can correspond to $K^2/64$ views.

As shown in FIG. 8, aspects of the present disclosure can utilize a resolve pass with one or more zones. During the resolve pass, the final geometry can be rendered. As such, the objects can be rasterized into zones, e.g., zones 801-804. For a particular camera viewpoint, e.g., viewpoint 820, the visibility information can be reused from a substantially similar camera viewpoint. By doing so, the present disclosure can determine or infer what objects are visible on a particular line or sight, e.g., viewing ray 840. So the present disclosure can trace the ray 840 through the zones until an object, e.g., object 810, is intersected that has been rasterized in one of the particular zones or sub-buffers. As such, the present disclosure can determine which objects are visible by utilizing viewable information from each zone or sub-buffer.

As indicated above, a mesh shader can be used to instantiate a geometric primitive that is rendered into each of the sub-buffers or views. The mesh shader can produce the instances of the primitive. For example, for primitives that are far away from a camera or viewpoint, a single instance may be sufficient. The present disclosure can utilize different structures, e.g., an octree structure, to reduce the amount of images that are a far distance from a camera viewpoint. An octree is a data structure for arranging objects in space. For example, an octree can subdivide space in three dimensions into a number of octants, e.g., eight octants. The octree structure can determine the number of copies of primitives that are in one node per octree. This can result in an efficient creation of data.

Aspects of the present disclosure can also include fast zone rendering. In some aspects, rather than discarding instances, aspects of the present disclosure can utilize an octree front-to-back traversal. Moreover, aspects of the present disclosure can include one render call per zone, e.g., using octree nodes that lie in the zone or a number of instances for the zone.

Figure 9:
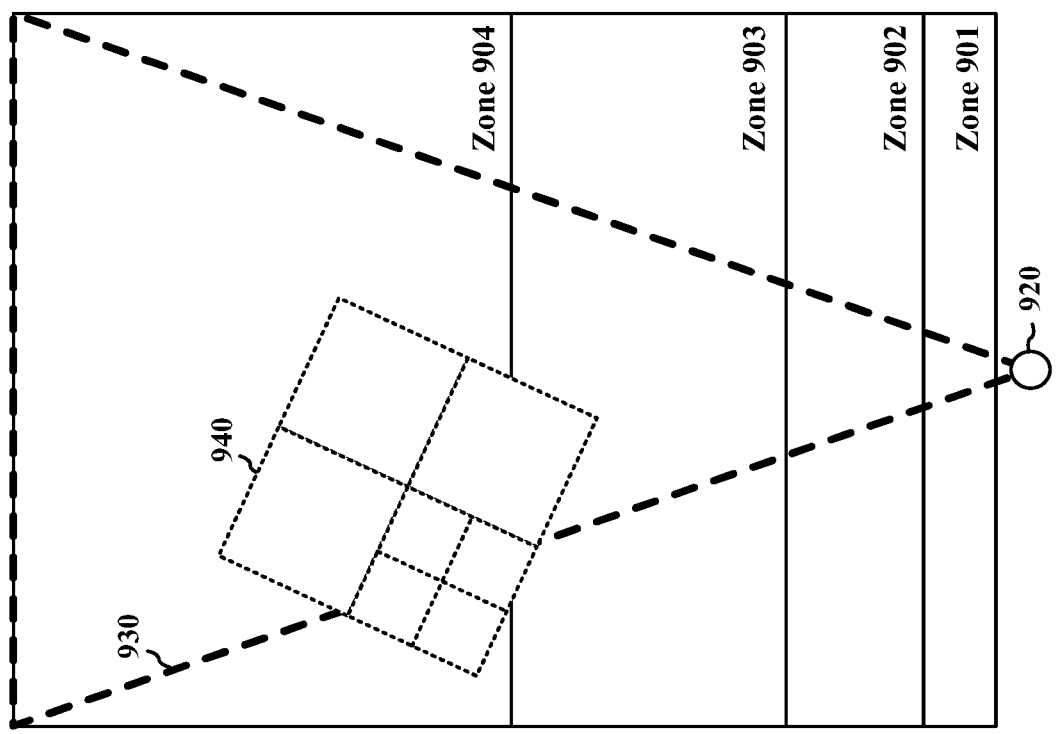
FIG. 9 illustrates an example scene in accordance with one or more techniques of this disclosure.

FIG. 9 illustrates scene 900 in accordance with one or more techniques of this disclosure. As shown in FIG. 9, scene 900 includes a number of zones, e.g., zone 901, zone 902, zone 903, and zone 904, viewpoint or camera 920, viewing frustum 930, and octree 940. FIG. 9 displays the aforementioned fast zone rendering according to the present disclosure. For instance, octree 940 can be a data structure for arranging objects in space. Octree 940 can be utilized to reduce the amount of images a far distance away from viewpoint 920. Octree 940 also includes a number of octants, each of which can include a number of instances. For example, one octant in octree 940 can include $K^2/16$ instances, and other octants can include $K^2/64$ instances. Moreover, some octants in octree 940, e.g., smaller octants, can be used to cull data.

Aspects of the present disclosure can also utilize an approximate spherical projection.

For instance, regular perspective projections may be inefficient for a large frame of view (FOV), e.g., 150°, as there may be an oversampling along the periphery. So rasterization can get inefficient in the periphery of an image. The present disclosure can subdivide frustum into sub-frusta, e.g., 2×2 or 3×3 sub-frusta. So the viewing frustum to be rendered can be subdivided. This can be similar to lens-matched shading, but include a different goal and/or a different projection matrix. In some aspects, an increased amount of sub-frusta can result in an improved approximation of the ideal spherical projection. Further, primitives may be rendered into a relevant frustum. Some primitives may overlap multiple frusta. Similar to the aforementioned zones, aspects of the present disclosure can pre-sort primitives using octree bounding boxes.

Figure 10:
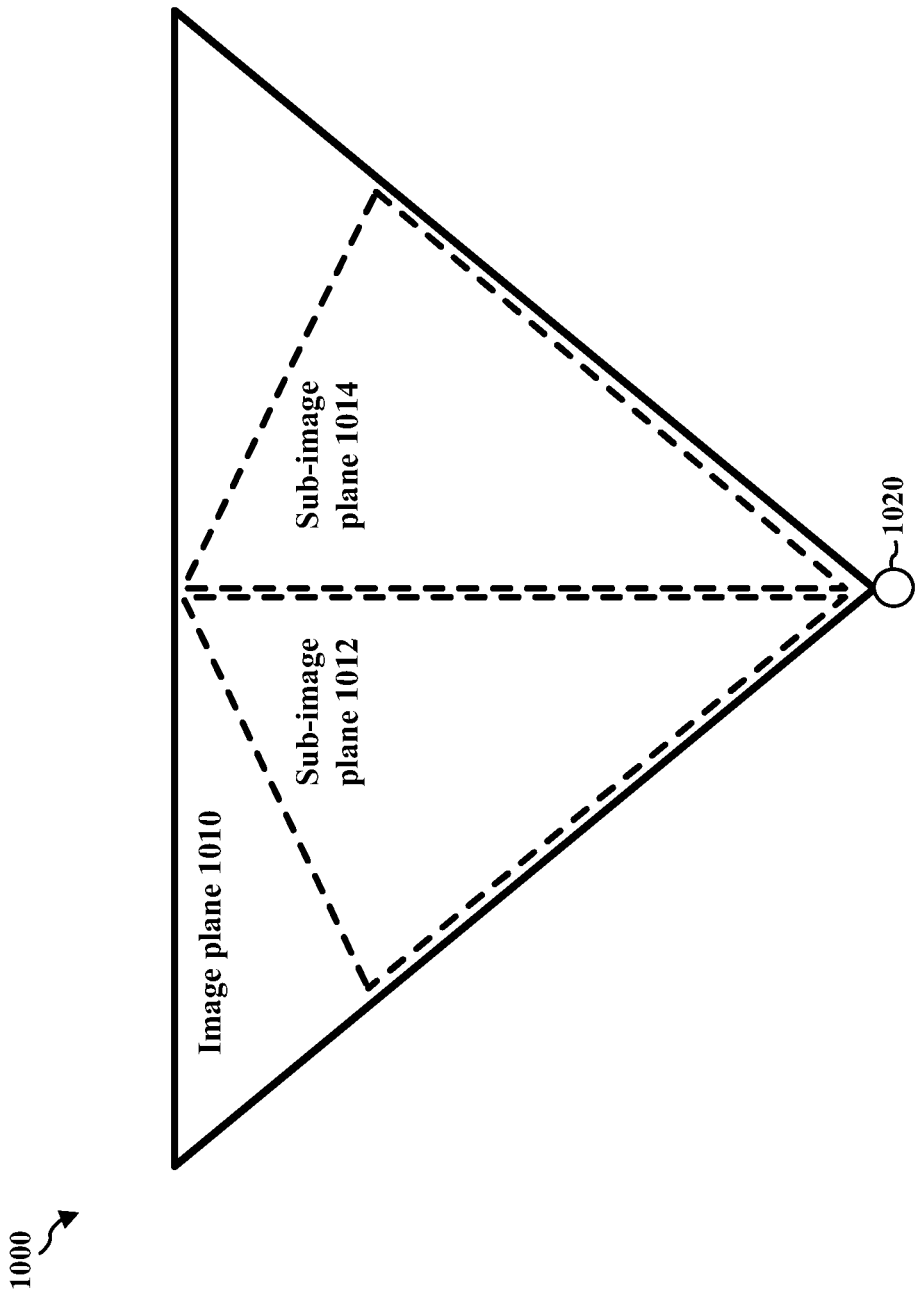
FIG. 10 illustrates an example image in accordance with one or more techniques of this disclosure.

FIG. 10 illustrates image 1000 in accordance with one or more techniques of this disclosure. As shown in FIG. 10, image 1000 includes an image plane 1010, sub-image plane 1012, sub-image plane 1014, and viewpoint or camera 1020. FIG. 10 displays the aforementioned spherical projection according to the present disclosure. For instance, the frustum for image plane 1010 can be subdivided into sub-frusta for sub-image planes 1012 and 1014. This increased amount of sub-frusta, e.g., sub-frusta for sub-image planes 1012 and 1014, can result in an improved approximation of an ideal spherical projection.

As indicated here, aspects of the present disclosure can include a rendering system that generates multiple views of a scene using rasterization. For example, the present disclosure can generate multiple views without having to execute a full rasterization pipeline separately for each view. In some aspects, shading can be determined in object-space, e.g., to decouple shading from a geometry rasterization of multiple views. Further, an id buffer can be generated per view, such that a set union of id buffers may yield a potentially visible set of geometric primitives. Also, a scene can be subdivided into multiple zones depending on the distance to the viewpoint, and each zone can be rendered separately into a number of views. Each zone can be selected such that the disparity between views is below a constant threshold. This can reduce the amount of views that are necessary. Additionally, a viewing frustum can be subdivided into multiple frusta with a smaller subtended angle, and a separate view can be rendered for each frusta.

FIGS. 7-10 illustrate examples of the aforementioned processes for efficient multi-view rasterization. As shown in FIGS. 7-10, aspects of the present disclosure, e.g., GPUs herein, can perform a number of different steps or processes to reduce the amount of viewpoints that are generated for multi-view rasterization. For instance, GPUs herein can determine at least one scene, e.g., scene 700 and 800, including one or more viewpoints, e.g., viewpoints 720 and 820.

Also, GPUs herein can divide the at least one scene, e.g., scene 700 and 800, into a plurality of zones, e.g., zones 701-704 and 801-804, based on each of the one or more viewpoints, e.g., viewpoints 720 and 820. Further, GPUs herein can determine whether a zone, e.g., zone 704, based on one viewpoint, e.g., viewpoint 720, of the one or more viewpoints is substantially similar to a zone, e.g., zone 804, based on another viewpoint, e.g., viewpoint 820, of the one or more viewpoints.

GPUs herein can also generate a geometry buffer, e.g., G-buffers 504, for each of the plurality of zones, e.g., zones 701-704 and 801-804, based on the one or more viewpoints, e.g., viewpoints 720 and 820. Moreover, GPUs herein can combine the geometry buffers, e.g., G-buffers 504, for each of the plurality of zones, e.g., zones 701-704 and 801-804, based on the one or more viewpoints, e.g., viewpoints 720 and 820. In some aspects, the combined geometry buffers, e.g., G-buffers 504, can correspond to a potentially visible set of primitives, e.g., including primitive 710.

GPUs herein can also determine shading information for at least some of the potentially visible set of primitives, e.g., primitive 710. Additionally, GPUs herein can store at least some of the potentially visible set of primitives, e.g., primitive 710. For example, the potentially visible set of primitives can be stored in a memory, e.g., system memory 124 and/or internal memory 121. In some aspects, the geometry buffer for each of the plurality of zones, e.g., zones 701-704 and 801-804, may include an identification buffer and a depth buffer. Also, the identification buffer can correspond to a visible set of primitives, e.g., including primitive 710.

In some instances, the at least one scene may be divided into the plurality of zones based on one or more dividing criteria, e.g., viewing frustum 730 and viewing frustum 830. The one or more dividing criteria can include at least one of a distance to each of the one or more viewpoints or an angle of an optical axis of each of the one or more viewpoints, e.g., viewing frustum 730 and viewing frustum 830. Further, the zone based on the one viewpoint, e.g., zone 704, may be determined to be substantially similar to the zone based on the another viewpoint, e.g., zone 804, based on the one or more dividing criteria, e.g., viewing frustum 730 and viewing frustum 830.

GPUs herein can also render at least one image based on the geometry buffer for each of the plurality of zones, e.g., zones 701-704 and 801-804, of the one or more viewpoints, e.g., viewpoints 720 and 820. In some aspects, the at least one image may be rendered based on shading information for a potentially visible set of primitives, e.g., including primitive 710. Also, the at least one image may include a plurality of pixels, where each of the plurality of pixels of the at least one image may be rendered based on an intersection of a viewing ray, e.g., viewing ray 840, and the pixel, e.g., object 810. In some instances, the viewing ray, e.g., viewing ray 840, can traverse each of the plurality of zones, e.g., zones 801-804.

GPUs herein can also generate the at least one scene, e.g., scene 800, including one or more viewpoints, e.g., viewpoint 820. In some aspects, the determination whether a zone, e.g., zone 704, based on one viewpoint, e.g., viewpoint 720, of the one or more viewpoints is substantially similar to a zone, e.g., zone 804, based on another viewpoint, e.g., viewpoint 820, of the one or more viewpoints may be performed by a graphics processing unit (GPU) or a central processing unit (CPU).

Figure 11:
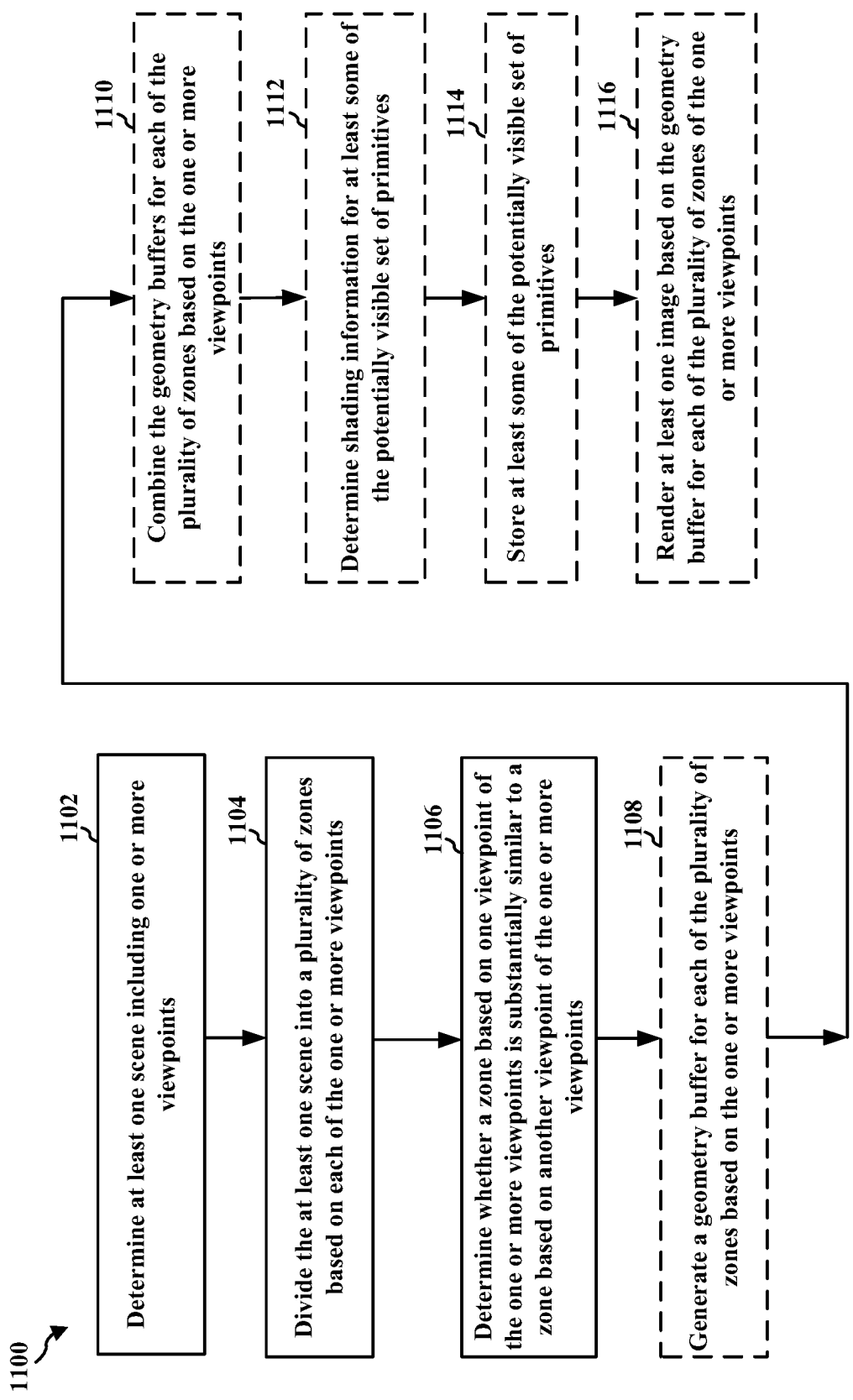
FIG. 11 illustrates an example flowchart of an example method in accordance with one or more techniques of this disclosure.

FIG. 11 illustrates a flowchart 1100 of an example method in accordance with one or more techniques of this disclosure. The method may be performed by an apparatus such as a GPU, a CPU, or an apparatus for graphics processing. At 1102, the apparatus may determine at least one scene including one or more viewpoints, as described in connection with the examples in FIGS. 5-10. At 1104, the apparatus can divide the at least one scene into a plurality of zones based on each of the one or more viewpoints, as described in connection with the examples in FIGS. 5-10.

At 1106, the apparatus can determine whether a zone based on one viewpoint of the one or more viewpoints is substantially similar to a zone based on another viewpoint of the one or more viewpoints, as described in connection with the examples in FIGS. 5-10. At 1108, the apparatus can generate a geometry buffer for each of the plurality of zones based on the one or more viewpoints, as described in connection with the examples in FIGS. 5-10. At 1110, the apparatus can combine the geometry buffers for each of the plurality of zones based on the one or more viewpoints, as described in connection with the examples in FIGS. 5-10. In some aspects, the combined geometry buffers may correspond to a potentially visible set of primitives, as described in connection with the examples in FIGS. 5-10.

At 1112, the apparatus can determine shading information for at least some of the potentially visible set of primitives, as described in connection with the examples in FIGS. 5-10. At 1114, the apparatus can also store at least some of the potentially visible set of primitives, as described in connection with the examples in FIGS. 5-10. In some aspects, the geometry buffer for each of the plurality of zones may include an identification buffer and a depth buffer, as described in connection with the examples in FIGS. 5-10. Also, the identification buffer can correspond to a visible set of primitives, as described in connection with the examples in FIGS. 5-10.

In some aspects, the at least one scene may be divided into the plurality of zones based on one or more dividing criteria, as described in connection with the examples in FIGS. 5-10. The one or more dividing criteria can include at least one of a distance to each of the one or more viewpoints or an angle of an optical axis of each of the one or more viewpoints, as described in connection with the examples in FIGS. 5-10. Further, the zone based on the one viewpoint determined to be substantially similar to the zone based on the another viewpoint may be based on the one or more dividing criteria, as described in connection with the examples in FIGS. 5-10.

At 1116, the apparatus can render at least one image based on the geometry buffer for each of the plurality of zones of the one or more viewpoints, as described in connection with the examples in FIGS. 5-10. In some aspects, the at least one image may be rendered based on shading information for a potentially visible set of primitives, as described in connection with the examples in FIGS. 5-10. Also, the at least one image may include a plurality of pixels, where each of the plurality of pixels of the at least one image may be rendered based on an intersection of a viewing ray and the pixel, as described in connection with the examples in FIGS. 5-10. In some instances, the viewing ray can traverse each of the plurality of zones, as described in connection with the examples in FIGS. 5-10.

The apparatus can also generate the at least one scene including one or more viewpoints, as described in connection with the examples in FIGS. 5-10. In some aspects, the determination whether a zone based on one viewpoint of the one or more viewpoints is substantially similar to a zone based on another viewpoint of the one or more viewpoints may be performed by a GPU or a CPU, as described in connection with the examples in FIGS. 5-10.

In one configuration, a method or apparatus for graphics processing is provided. The apparatus may be a CPU, a GPU, or some other processor that can perform graphics processing. In one aspect, the apparatus may be the processing unit 120 within the device 104, or may be some other hardware within device 104 or another device. The apparatus may include means for determining at least one scene including one or more viewpoints. The apparatus may also include means for dividing the at least one scene into a plurality of zones based on each of the one or more viewpoints. The apparatus may also include means for determining whether a zone based on one viewpoint of the one or more viewpoints is substantially similar to a zone based on another viewpoint of the one or more viewpoints. The apparatus may also include means for generating a geometry buffer for each of the plurality of zones based on the one or more viewpoints. The apparatus may also include means for combining the geometry buffers for each of the plurality of zones based on the one or more viewpoints. The apparatus may also include means for determining shading information for at least some of the potentially visible set of primitives. The apparatus may also include means for storing at least some of the potentially visible set of primitives. The apparatus may also include means for rendering at least one image based on the geometry buffer for each of the plurality of zones of the one or more viewpoints. The apparatus may also include means for generating the at least one scene including one or more viewpoints.

The subject matter described herein can be implemented to realize one or more benefits or advantages. For instance, the described graphics processing techniques can be used by a GPU, a CPU, or some other processor that can perform graphics processing to implement the multi-view rasterization techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can reduce the amount of viewpoints that are generated in multi-view rasterization, e.g., for objects at a far distance from a viewpoint or camera.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
   determining at least one scene including a plurality of viewpoints;
   dividing the at least one scene into a plurality of zones based on each of the plurality of viewpoints;
   determining whether a zone based on one viewpoint of the plurality of viewpoints is substantially similar to a zone based on another viewpoint of the plurality of viewpoints; and
   generating a geometry buffer for each of the plurality of zones based on the plurality of viewpoints.

2. The method of claim 1, further comprising:
combining the geometry buffers for each of the plurality of zones based on the plurality of viewpoints.

3. The method of claim 2, wherein the combined geometry buffers correspond to a potentially visible set of primitives.

4. The method of claim 3, further comprising:
determining shading information for at least some of the potentially visible set of primitives.

5. The method of claim 3, further comprising:
storing at least some of the potentially visible set of primitives.

6. The method of claim 1, wherein the geometry buffer for each of the plurality of zones includes an identification buffer and a depth buffer.

7. The method of claim 6, wherein the identification buffer corresponds to a visible set of primitives.

8. The method of claim 1, wherein the at least one scene is divided into the plurality of zones based on one or more dividing criteria.

9. The method of claim 8, wherein the one or more dividing criteria includes at least one of a distance to each of the plurality of viewpoints or an angle of an optical axis of each of the plurality of viewpoints.

10. The method of claim 8, wherein the zone based on the one viewpoint is determined to be substantially similar to the zone based on the another viewpoint based on the one or more dividing criteria.

11. The method of claim 1, further comprising:
rendering at least one image based on the geometry buffer for each of the plurality of zones of the plurality of viewpoints.

12. The method of claim 11, wherein the at least one image is rendered based on shading information for a potentially visible set of primitives.

13. The method of claim 11, wherein the at least one image includes a plurality of pixels, wherein each of the plurality of pixels of the at least one image is rendered based on an intersection of a viewing ray and the pixel.

14. The method of claim 13, wherein the viewing ray traverses each of the plurality of zones.

15. The method of claim 1, wherein determining the at least one scene including a plurality of viewpoints comprises:
generating the at least one scene including a plurality of viewpoints.

16. The method of claim 1, wherein the determination whether a zone based on one viewpoint of the plurality of viewpoints is substantially similar to a zone based on another viewpoint of the plurality of viewpoints is performed by a graphics processing unit (GPU) or a central processing unit (CPU).

17. An apparatus for graphics processing, comprising:
a memory; and
at least one processor coupled to the memory and configured to:
determine at least one scene including a plurality of viewpoints;
divide the at least one scene into a plurality of zones based on each of the plurality of viewpoints;
determine whether a zone based on one viewpoint of the plurality of viewpoints is substantially similar to a zone based on another viewpoint of the plurality of viewpoints; and
generate a geometry buffer for each of the plurality of zones based on the plurality of viewpoints.

18. The apparatus of claim 17, wherein the at least one processor is further configured to:
combine the geometry buffers for each of the plurality of zones based on the plurality of viewpoints.

19. The apparatus of claim 18, wherein the combined geometry buffers correspond to a potentially visible set of primitives.

20. The apparatus of claim 19, wherein the at least one processor is further configured to:
determine shading information for at least some of the potentially visible set of primitives.

21. The apparatus of claim 19, wherein the at least one processor is further configured to:
store at least some of the potentially visible set of primitives.

22. The apparatus of claim 17, wherein the geometry buffer for each of the plurality of zones includes an identification buffer and a depth buffer.

23. The apparatus of claim 22, wherein the identification buffer corresponds to a visible set of primitives.

24. The apparatus of claim 17, wherein the at least one scene is divided into the plurality of zones based on one or more dividing criteria.

25. The apparatus of claim 24, wherein the one or more dividing criteria includes at least one of a distance to each of the plurality of viewpoints or an angle of an optical axis of each of the plurality of viewpoints.

26. The apparatus of claim 24, wherein the zone based on the one viewpoint is determined to be substantially similar to the zone based on the another viewpoint based on the one or more dividing criteria.

27. The apparatus of claim 17, wherein the at least one processor is further configured to:
render at least one image based on the geometry buffer for each of the plurality of zones of the plurality of viewpoints.

28. The apparatus of claim 27, wherein the at least one image is rendered based on shading information for a potentially visible set of primitives.

29. The apparatus of claim 27, wherein the at least one image includes a plurality of pixels, wherein each of the plurality of pixels of the at least one image is rendered based on an intersection of a viewing ray and the pixel.

30. The apparatus of claim 29, wherein the viewing ray traverses each of the plurality of zones.

31. The apparatus of claim 17, wherein to determine the at least one scene including a plurality of viewpoints comprises the at least one processor is further configured to:
generate the at least one scene including a plurality of viewpoints.

32. The apparatus of claim 17, wherein the determination whether a zone based on one viewpoint of the plurality of viewpoints is substantially similar to a zone based on another viewpoint of the plurality of viewpoints is performed by a graphics processing unit (GPU) or a central processing unit (CPU).

33. An apparatus for graphics processing, comprising:
means for determining at least one scene including a plurality of viewpoints;
means for dividing the at least one scene into a plurality of zones based on each of the plurality of viewpoints;
means for determining whether a zone based on one viewpoint of the plurality of viewpoints is substantially similar to a zone based on another viewpoint of the plurality of viewpoints; and
means for generating a geometry buffer for each of the plurality of zones based on the plurality of viewpoints.

34. The apparatus of claim 33, further comprising:
means for combining the geometry buffers for each of the plurality of zones based on the plurality of viewpoints.

35. The apparatus of claim 34, wherein the combined geometry buffers correspond to a potentially visible set of primitives.

36. The apparatus of claim 35, further comprising:
means for determining shading information for at least some of the potentially visible set of primitives.

37. The apparatus of claim 35, further comprising:
means for storing at least some of the potentially visible set of primitives.

38. The apparatus of claim 33, wherein the geometry buffer for each of the plurality of zones includes an identification buffer and a depth buffer.

39. The apparatus of claim 38, wherein the identification buffer corresponds to a visible set of primitives.

40. The apparatus of claim 33, wherein the at least one scene is divided into the plurality of zones based on one or more dividing criteria.

41. The apparatus of claim 40, wherein the one or more dividing criteria includes at least one of a distance to each of the plurality of viewpoints or an angle of an optical axis of each of the plurality of viewpoints.

42. The apparatus of claim 40, wherein the zone based on the one viewpoint is determined to be substantially similar to the zone based on the another viewpoint based on the one or more dividing criteria.

43. The apparatus of claim 33, further comprising:
means for rendering at least one image based on the geometry buffer for each of the plurality of zones of the plurality of viewpoints.

44. The apparatus of claim 43, wherein the at least one image is rendered based on shading information for a potentially visible set of primitives.

45. The apparatus of claim 43, wherein the at least one image includes a plurality of pixels, wherein each of the plurality of pixels of the at least one image is rendered based on an intersection of a viewing ray and the pixel.

46. The apparatus of claim 45, wherein the viewing ray traverses each of the plurality of zones.

47. The apparatus of claim 33, wherein the means for determining at least one scene including a plurality of viewpoints is configured to:
generate the at least one scene including the plurality of viewpoints.

48. The apparatus of claim 33, wherein the determination whether a zone based on one viewpoint of the plurality of viewpoints is substantially similar to a zone based on another viewpoint of the plurality of viewpoints is performed by a graphics processing unit (GPU) or a central processing unit (CPU).

49. A non-transitory computer-readable medium storing computer executable code for graphics processing, comprising code to:
determine at least one scene including a plurality of viewpoints;
divide the at least one scene into a plurality of zones based on each of the plurality of viewpoints;
determine whether a zone based on one viewpoint of the plurality of viewpoints is substantially similar to a zone based on another viewpoint of the plurality of viewpoints; and
generate a geometry buffer for each of the plurality of zones based on the plurality of viewpoints.

* * * * *